(12) United States Patent
Lai et al.

(10) Patent No.: US 7,276,660 B2
(45) Date of Patent: Oct. 2, 2007

(54) ELECTRONIC DEVICE AND LATCH STRUCTURE THEREOF

(75) Inventors: Jung-Kun Lai, Taipei (TW);
Chi-Chung Ho, Taipei (TW);
Liang-Ying Lin, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 0 days.

(21) Appl. No.: 11/648,833

(22) Filed: Jan. 3, 2007

(65) Prior Publication Data

US 2007/0151749 A1    Jul. 5, 2007

(30) Foreign Application Priority Data

Jan. 2, 2006    (TW) .............................. 95100115 A

(51) Int. Cl.
*H01J 5/00*    (2006.01)
(52) U.S. Cl. ............................ 174/50; 174/58; 174/64; 174/135; 248/917; 361/680; 345/167
(58) Field of Classification Search .................. 174/50, 174/17 R, 58, 63, 64, 135; 220/4.02; 361/680–683; 248/917–923; 292/8, 56; 345/167, 179
See application file for complete search history.

(56) References Cited

U.S. PATENT DOCUMENTS

| 5,404,271 | A | * | 4/1995 | Satou et al. ................. 361/684 |
| 5,448,446 | A | * | 9/1995 | Honda et al. ................ 361/680 |
| 5,497,296 | A | * | 3/1996 | Satou et al. ................. 361/681 |
| 6,172,867 | B1 | * | 1/2001 | Satou et al. ................. 361/680 |
| 7,049,512 | B1 | * | 5/2006 | Chung et al. ................... 174/58 |
| 7,153,050 | B2 | * | 12/2006 | Liu et al. ..................... 400/682 |

* cited by examiner

*Primary Examiner*—Dhiru R. Patel
(74) *Attorney, Agent, or Firm*—Birch, Stewart, Kolasch & Birch, LLP

(57) ABSTRACT

A latch structure disposed in a casing having a first opening and a second opening includes a pressing member, an elastic member, a hook member and a guiding member. The pressing member is disposed in the first opening. The elastic member has one side connected with the casing and the other side connected with the pressing member. The hook member pivoted with the pressing member has a hook portion and a protrusion. The guiding member has a multi-route circle groove, which has a first route, a second route, a third route, and a fourth route in turn. A step exists between two adjacent routes. The moved pressing member moves the protrusion along the first route, the second route, the third route and the fourth route such that the hook portion passes through the second opening to be exposed from the casing or be hidden inside the casing.

28 Claims, 9 Drawing Sheets

ELECTRONIC DEVICE AND LATCH STRUCTURE THEREOF

BACKGROUND OF THE INVENTION

1. Field of Invention

The invention relates to a latch structure, and, in particular, to a latch structure to be applied to an electronic device.

2. Related Art

As shown in FIG. 1, a conventional notebook computer 1 has a liquid crystal display 11, a host 12 and a latch assembly 13. A first side of the liquid crystal display 11 is pivoted with a first side of the host 12. A second side of the liquid crystal display 11 and a second side of the host 12 are attached with a latch assembly 13. Herein, the latch assembly 13 includes a hook 131, a groove 132 and a pushbutton 133. When the liquid crystal display 11 and the host 12 are to be locked, the liquid crystal display 11 is closed onto the host 12 such that the hook 131 disposed on the liquid crystal display 11 hooks the groove 132 of the host 12. Consequently, the closed liquid crystal display 11 and the host 12 are fixed, and the keys disposed on the host 12 as well as the screen of the liquid crystal display 11 are protected such that the notebook computer 1 may be carried conveniently. When the notebook computer 1 is to be opened, the pushbutton 133 connected with the hook 131 has to be actuated in order to cancel the locked state of the latch assembly 13.

However, when the latch assembly 13 is in an open state, the hook 131 of the latch assembly 13 is exposed out of the liquid crystal display 11. Thus, the visual glory is influenced, and it is quite inconvenient because the hook 131 is touched and thus deformed or broken when the user is opening or closing the notebook computer.

Thus, it is an important subject of the invention to provide an electronic device and a latch structure thereof capable of eliminating the drawback of exposed hook of the latch assembly and preventing the hook from deforming and being broken.

SUMMARY OF THE INVENTION

In view of the foregoing, the invention is to provide an electronic device having a hook member that can be hidden inside a casing, and a latch structure of the electronic device.

To achieve the above, a latch structure of the invention is disposed in a casing, which has a first surface and a second surface disposed opposite to the first surface. The first surface and the second surface are formed with a first opening and a second opening, respectively. The latch structure includes a pressing member, an elastic member, a hook member and a guiding member. The pressing member passes through the first opening. One side of the elastic member is connected with the casing and another side is connected with the pressing member. The hook member is pivoted with the pressing member and has a hook portion and a protrusion connected with the hook portion. The hook portion is positioned opposite to the second opening and is capable of passing through the second opening to be exposed from the casing or be hidden inside the casing. The guiding member has a multi-route circle groove, which has a first route, a second route, a third route, and a fourth route in turn. Steps are formed between the first route and the second route, between the second route, between the third route and the fourth route and between the fourth route and the first route. The protrusion of the hook member is slidably disposed in the multi-route circle groove. The pressing member moves the protrusion along the first route, the second route, the third route and the fourth route in turn. When the pressing member is moved, the pressing member moves the protrusion in the multi-route circle groove such that the hook portion passes through the second opening to be exposed from the casing or be hidden inside the casing.

To achieve the above, an electronic device of the invention includes a first casing, a second casing and a latch structure. The second casing is pivoted with the first casing and has a first surface and a second surface disposed opposite to the first surface. The first surface and the second surface are formed with a first opening and a second opening, respectively. The latch structure is disposed in the second casing and includes a pressing member, an elastic member, a hook member and a guiding member. The pressing member passes through the first opening. One side of the elastic member is connected with the second casing and another side is connected with the pressing member. The hook member is pivoted with the pressing member and has a hook portion, which is positioned opposite to the second opening, and a protrusion, which is connected with the hook portion. The guiding member has a multi-route circle groove, which has a first route, a second route, a third route, and a fourth route in turn. Steps are formed between the first route and the second route, between the second route and the third route, between the third route and the fourth route and between the fourth route and the first route. The protrusion of the hook member is slidably disposed in the multi-route circle groove. The pressing member moves the protrusion along the first route, the second route, the third route and the fourth route in turn. When the pressing member is moved, the pressing member moves the protrusion in the multi-route circle groove such that the hook portion passes through the second opening to be exposed from the casing or is hidden inside the second casing.

As mentioned above, the pressing member, the elastic member, the hook member and the guiding member in the electronic device and the latch structure thereof are particularly designed and connected. Thus, when the first casing is opened relative to the second casing, the hook portion of the hook member is hidden inside the second casing. Therefore, the visual glory effect may be achieved, and the hook member is free from collision and damage. As a result, the good industrial utility can be obtained.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
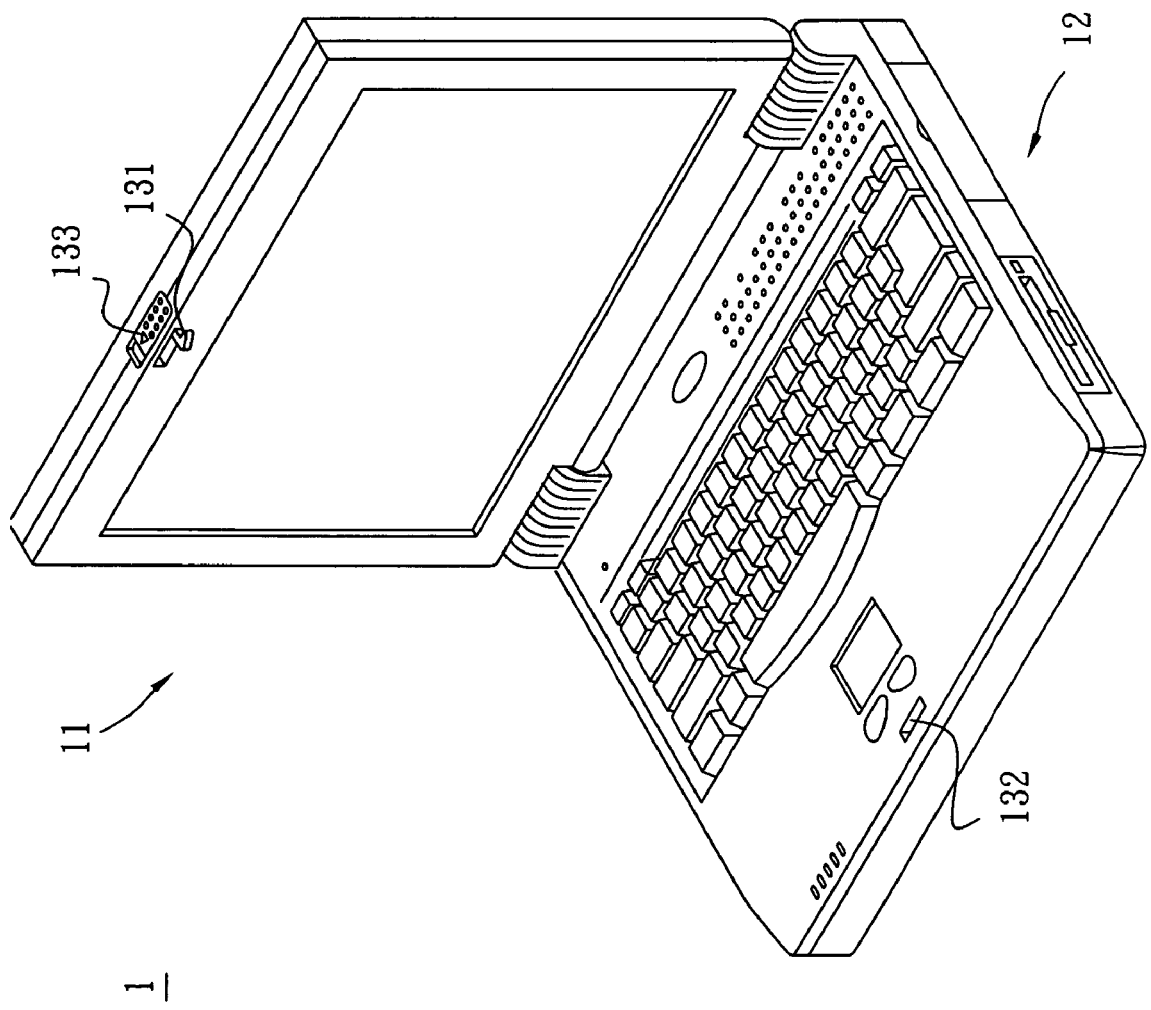
FIG. 1 is a schematic illustration showing the conventional electronic device having a latch structure.
Figure 2:
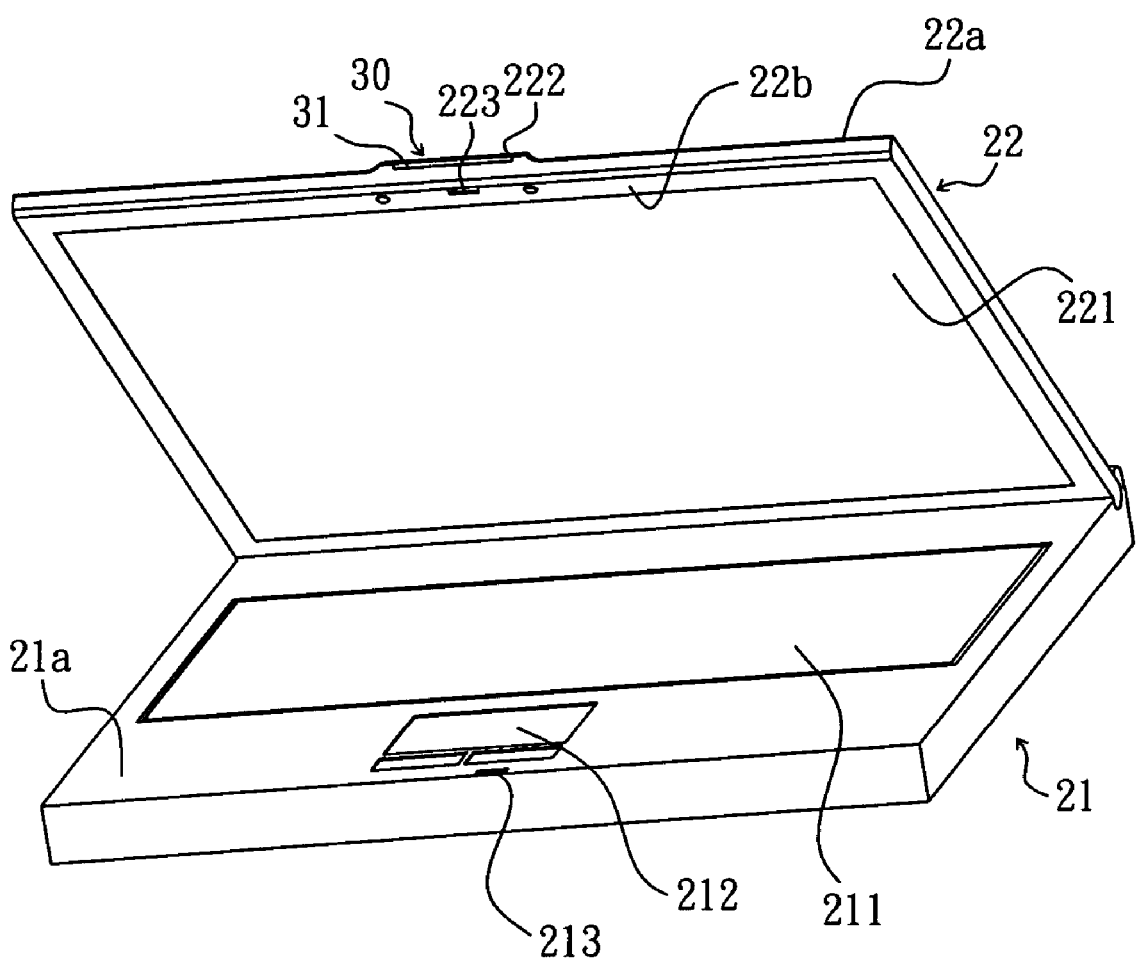
FIG. 2 is a schematic illustration showing an electronic device according to a preferred embodiment of the invention.

FIG. 2 shows an electronic device 2 according to a preferred embodiment of the invention. Referring to FIG. 2, the electronic device 2, which may be and not limited to a notebook computer, includes a first casing 21, a second casing 22 and a latch structure 30. Herein, the first casing 21 may be a base and the second casing 22 may be a cover.

For the sake of illustration, the first casing 21 is the base and the second casing 22 is the cover in the following example, but the first casing 21 and the second casing 22 are not particularly limited thereto.

Referring again to FIG. 2, a host portion of a notebook computer is disposed inside the first casing 21, and a surface 21a of the second casing 22 facing the first casing 21 is formed with a keyboard 211 and a touch panel 212. In addition, the first casing 21 has an engagement portion 213, which is a groove formed on the surface 21a of the first casing 21 in this embodiment.

In this embodiment, each of the first casing 21 and the second casing 22 is substantially rectangular, and the second casing 22 is pivoted with the first casing 21 and can be opened or closed relative to the first casing 21. A liquid crystal display 221 electrically connected with the host in the first casing 21 is disposed in the second casing 22 and can display information inputted through the keyboard 211 or the touch panel 212. However, this is not the issue of this invention, and the detailed descriptions thereof will be omitted. In addition, the second casing 22 has a first opening 222 and a second opening 223. The first opening 222 is disposed on a surface 22a of the second casing 22 opposite to the first casing 21. The second opening 223 is disposed on a surface 22b of the second casing 22 facing the first casing 21.

Figure 3:
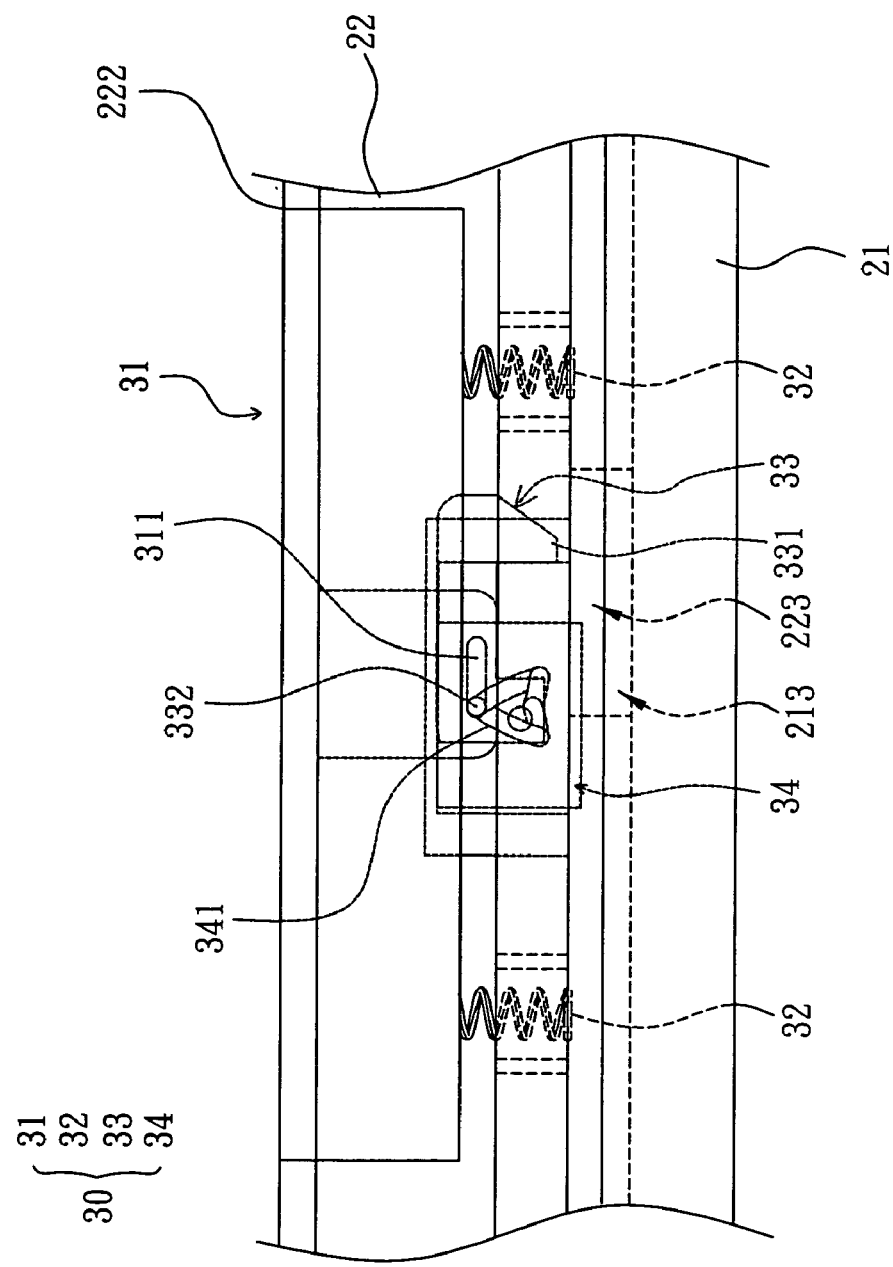
FIG. 3 is a schematic illustration showing an operation of the latch structure of the electronic device according to the preferred embodiment of the invention.

Referring to FIG. 3, the latch structure 30 disposed in the second casing 22 has a pressing member 31, an elastic member 32, a hook member 33 and a guiding member 34.

Referring again to FIGS. 3 and 7 of this embodiment, the pressing member 31 passes through the first opening 222 and may be moved by an external force in a first direction, which corresponds to a moving direction when the pressing member 31 is moved from the position of FIG. 3 to the position of FIG. 7. In addition, the pressing member 31 has a through hole 311.

Referring again to FIGS. 3, 7 and 8, the elastic member 32 is a spring in this embodiment. Of course, the elastic member may also be an elastomer or an elastic sheet. Herein, the elastic member 32 has one end connected with the second casing 22 and the other end connected with the pressing member 31. When the pressing member 31 is moved by an external force in a first direction, the elastic member 32 is compressed. When the external force is removed, the elastic member 32 generates a restoring force to move the pressing member 31 in a second direction opposite to the first direction. In this embodiment, the second direction corresponds to the moving direction when the pressing member 31 is moved from the position of FIG. 7 to the position of FIG. 8.

Figure 4:
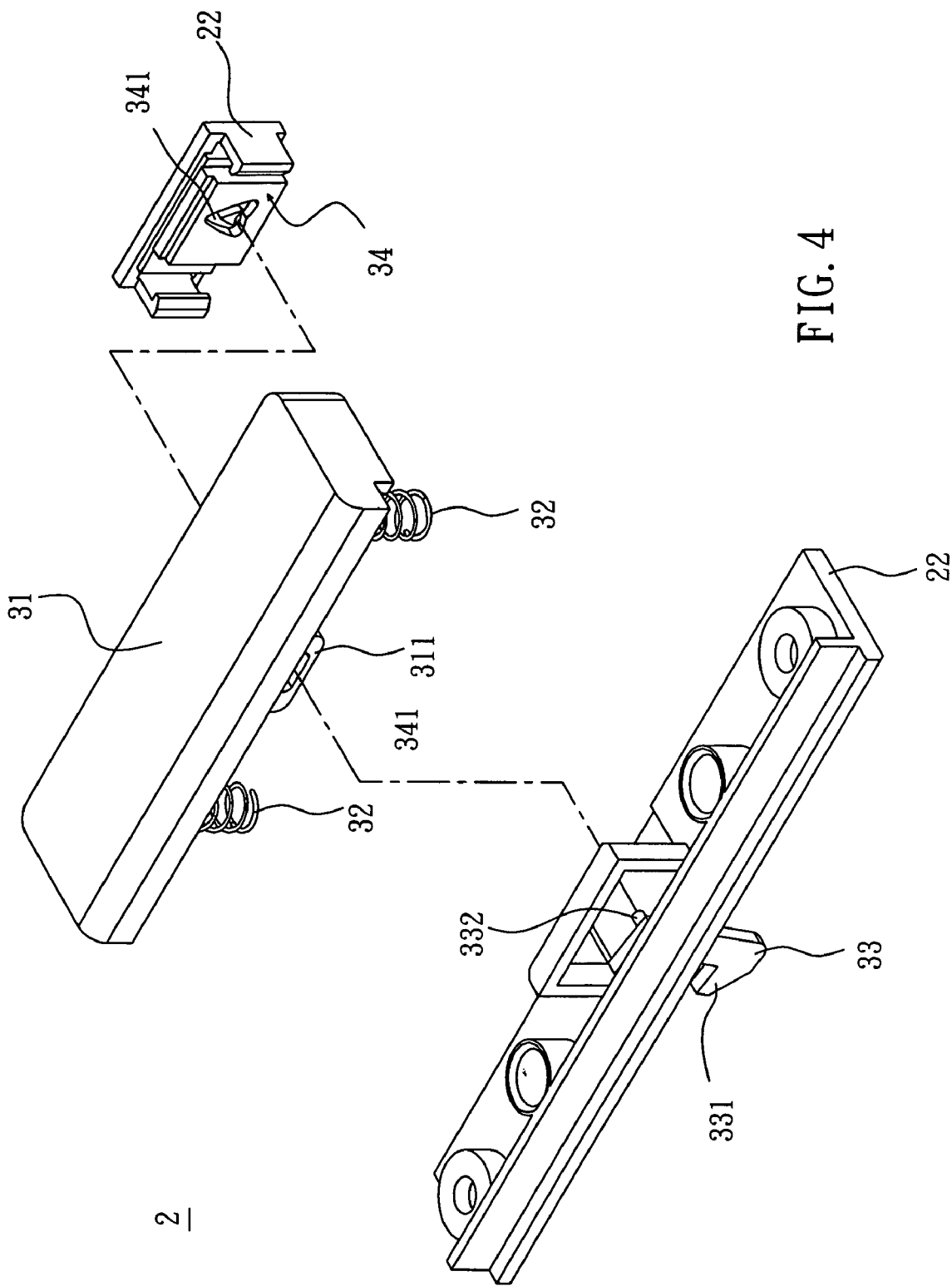
FIG. 4 is a partially pictorially exploded view showing an electronic device according to the preferred embodiment of the invention.

Referring to FIG. 4, the hook member 33 pivoted with the pressing member 31 has a hook portion 331 and a protrusion 332. The protrusion 332 is connected with the hook portion 331, and the position of the hook portion 331 corresponds to the second opening 223. In this embodiment, the protrusion 332 passes through the through hole 311 of the pressing member 31 and is pivoted with the pressing member 31.

Figure 5:
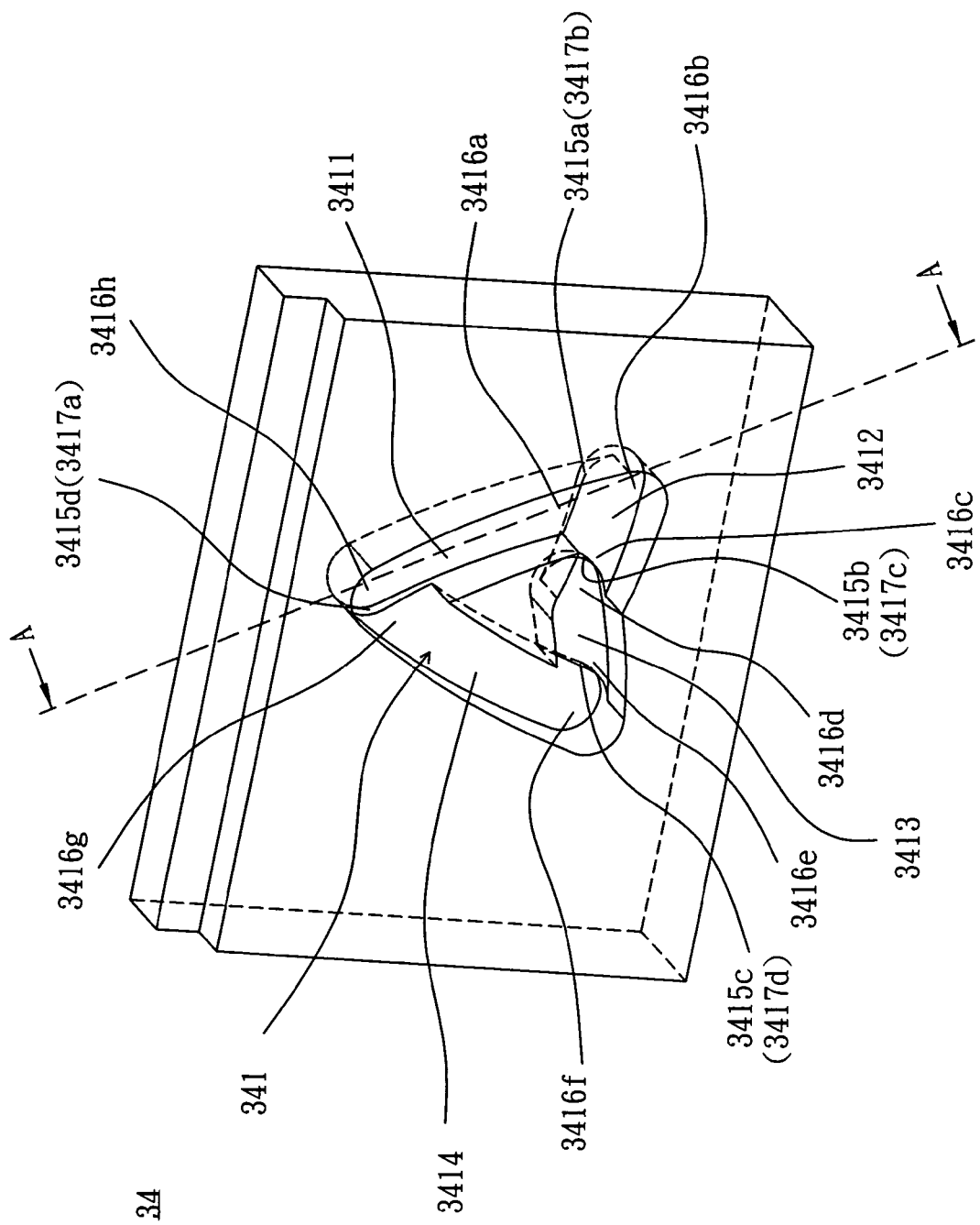
FIG. 5 is a schematic illustration showing a guiding member of the electronic device according to the preferred embodiment of the invention.

Referring to FIG. 5, the guiding member 34 has a multi-route circle groove 341, which has a first route 3411, a second route 3412, a third route 3413 and a fourth route 3414 in turn. In addition, a step 3415a exists between the first route 3411 and the second route 3412, a step 3415b exists between the second route 3412 and the third route 3413, a step 3415c exists between the third route 3413 and the fourth route 3414, and a step 3415d exists between the fourth route 3414 and the first route 3411.

Furthermore, as shown in FIG. 5, a first connecting bottom 3416a and a second connecting bottom 3416b are formed at an abutting portion between the first route 3411 and the second route 3412, a third connecting bottom 3416c and a fourth connecting bottom 3416d are formed at an abutting portion between the second route 3412 and the third route 3413, a fifth connecting bottom 3416e and a sixth connecting bottom 3416f are formed at an abutting portion between the third route 3413 and the fourth route 3414, and a seventh connecting bottom 3416g and an eighth connecting bottom 3416h are formed at an abutting portion between the fourth route 3414 and the first route 3411.

Figure 6:
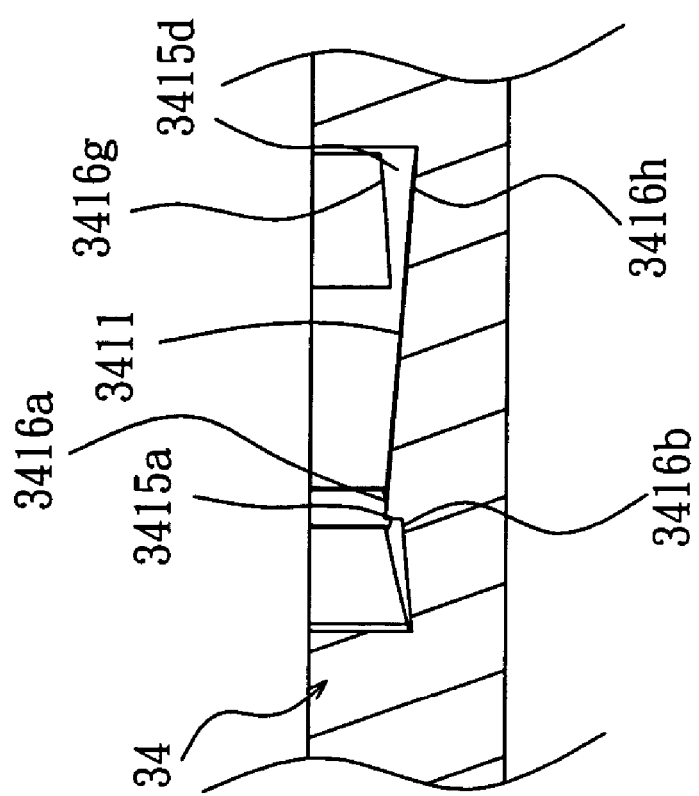
FIG. 6 is a cross-sectional view taken along a line A-A of FIG. 5 to show the guiding member of the electronic device according to the preferred embodiment of the invention.

Referring next to FIGS. 5 and 6, a depth of the first connecting bottom 3416a is smaller than a depth of the second connecting bottom 3416b, a depth of the third connecting bottom 3416c is smaller than a depth of the fourth connecting bottom 3416d, a depth of the fifth connecting bottom 3416e is smaller than a depth of the sixth connecting bottom 3416f, and a depth of the seventh connecting bottom 3416g is smaller than a depth of the eighth connecting bottom 3416h such that the steps 3415a, 3415b, 3415c and 3415d are respectively formed, as shown in FIG. 6.

In addition, the depth of the first route 3411 gradually decreases from the eighth connecting bottom 3416h to the first connecting bottom 3416a, the depth of the second route 3412 gradually decreases from the second connecting bottom 3416b to the third connecting bottom 3416c, the depth of the third route 3413 gradually decreases from the fourth connecting bottom 3416d to the fifth connecting bottom 3416e, and the depth of the fourth route 3414 gradually decreases from the sixth connecting bottom 3416f to the seventh connecting bottom 3416g.

According to the above-mentioned structure, when the moved pressing member 31 moves the protrusion 332 of the hook member 33 along the multi-route circle groove 341, the steps 3415a, 3415b, 3415c and 3415d enables the protrusion 332 to move along the first route 3411, the second route 3412, the third route 3413 and the fourth route 3414. Thus, the hook portion 331 passes through the second opening 223 to be exposed from the second casing 22 or is hidden inside the second casing 22. In addition, when the protrusion 332 slides in the multi-route circle groove 341, the guiding member 34 relatively slides in the second casing 22 in a direction perpendicular to the first direction or the second direction.

Referring again to FIG. 5, the multi-route circle groove 341 of this embodiment further includes a first turning portion 3417a, a second turning portion 3417b, a third turning portion 3417c and a fourth turning portion 3417d. The second turning portion 3417b and the fourth turning portion 3417d are respectively located at two sides of a straight line, wherein the straight line connects the first turning portion 3417a with the third turning portion 3417c. In addition, a vertical distance from the first turning portion 3417a to the pressing member 31 is smaller than a vertical distance from the third turning portion 3417c to the pressing member 31, a vertical distance from the third turning portion 3417c to the pressing member 31 is greater than a vertical distance from the second turning portion 3417b to the pressing member 31 and a vertical distance from the fourth turning portion 3417d to the pressing member 31. In this embodiment, the first turning portion 3417a, the second turning portion 3417b, the third turning portion 3417c and the fourth turning portion 3417d are adjacent to the steps 3415a, 3415b, 3415c and 3415d, respectively.

In this embodiment, when the pressing member 31 is moved by the external force in the first direction, the protrusion 332 is moved from the first route 3411 to the second route 3412 or from the third route 3413 to the fourth route 3414. In other words, the protrusion 332 is moved from the first turning portion 3417a to the second turning portion 3417b or from the third turning portion 3417c to the fourth turning portion 3417d. The step 3415d between the fourth route 3414 and the first route 3411 restricts the protrusion 332 to return from the first route 3411 to the fourth route 3414, and the step 3415b between the second route 3412 and the third route 3413 restricts the protrusion 332 to return from the third route 3413 to the second route 3412.

After the external force is removed, the restoring force of the elastic member 32 moves the pressing member 31 in the second direction. At this time, the protrusion 332 is moved from the second route 3412 to the third route 3413 or from the fourth route 3414 to the first route 3411. In other words, the protrusion 332 is moved from the second turning portion 3417b to the third turning portion 3417c or from the fourth turning portion 3417d to the first turning portion 3417a. The step 3415a between the first route 3411 and the second route 3412 restricts the protrusion 332 to return from the second route 3412 to the first route 3411, and the step 3415c between the third route 3413 and the fourth route 3414 restricts the protrusion 332 to return from the fourth route 3414 to the third route 3413.

The detailed implementation of this embodiment will be described in the following, wherein the opening and closing operations between the second casing 22 and the first casing 21 and the operations of the latch structure 30 are described.

First, the hook portion 331 of the hook member 33 is hidden inside the second casing 22 and is not engaged with the engagement portion 213 of the first casing 21, as shown in FIGS. 2 and 3. At this time, the second casing 22 and the first casing 21 may be freely opened.

Figure 7:
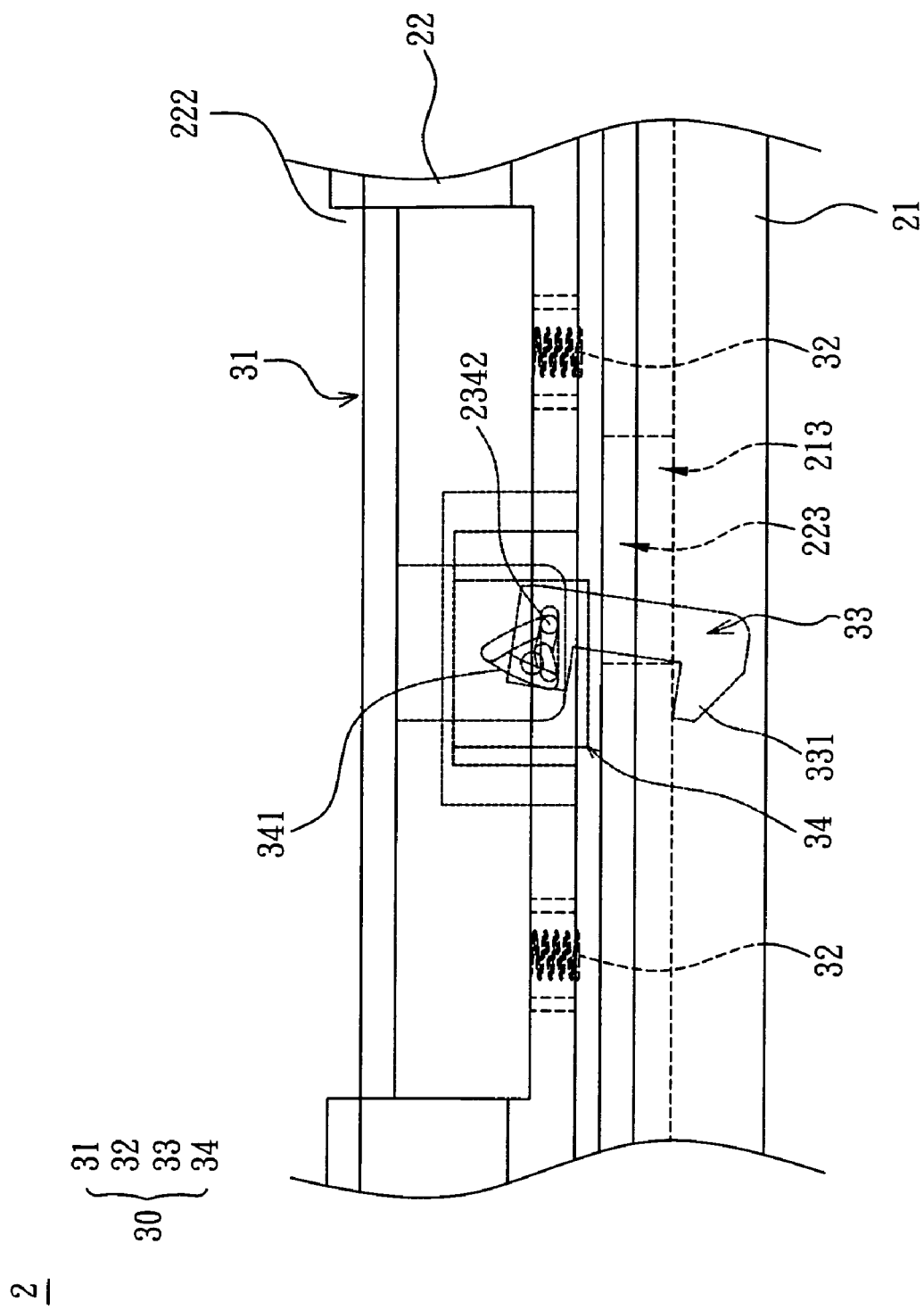
FIG. 7 is a schematic illustration showing another operation of the latch structure of the electronic device according to the preferred embodiment of the invention.

When the user wants to close and fix the second casing 22 onto the first casing 21, the second casing 22 is closed and attached onto the first casing 21 first. Next, the user applies the external force to the pressing member 31 such that the pressing member 31 is moved in the first direction and thus moves the protrusion 332 of the hook member 33 from the first route 3411 of the multi-route circle groove 341 to the second route 3412, as shown in FIGS. 3 and 7. At this time, the protrusion 332 is moved from the first turning portion 3417a to the second turning portion 3417b and the second turning portion 3417b interferes with the protrusion 332 such that the user cannot continue pushing the pressing member 31 in the first direction and the external force applied to the pressing member 31 is removed naturally. The step 3415a disables the protrusion 332 from returning to the first route 3411 from the second route 3412. Thereafter, the elastic member 32 generates a restoring force for pushing the pressing member 31 in the second direction. Referring again to FIG. 8, the protrusion 332 enters the third route 3413 from the second route 3412 with the movement of the pressing member 31. At this time, the protrusion 332 is moved from the second turning portion 3417b to the third turning portion 3417c and the third turning portion 3417c interferes with the protrusion 332 such that the restoring force cannot continue moving the protrusion 332. The step 3415b disables the protrusion 332 from returning to the second route 3412 from the third route 3413. At this time, the hook portion 331 of the hook member 33 passes through the second opening 223 of the second casing 22 to be exposed from the second casing 22 and engaged with the engagement portion 213 of the first casing 21. Consequently, the second casing 22 cannot be separated from the first casing 21 and can be well closed.

Figure 8:
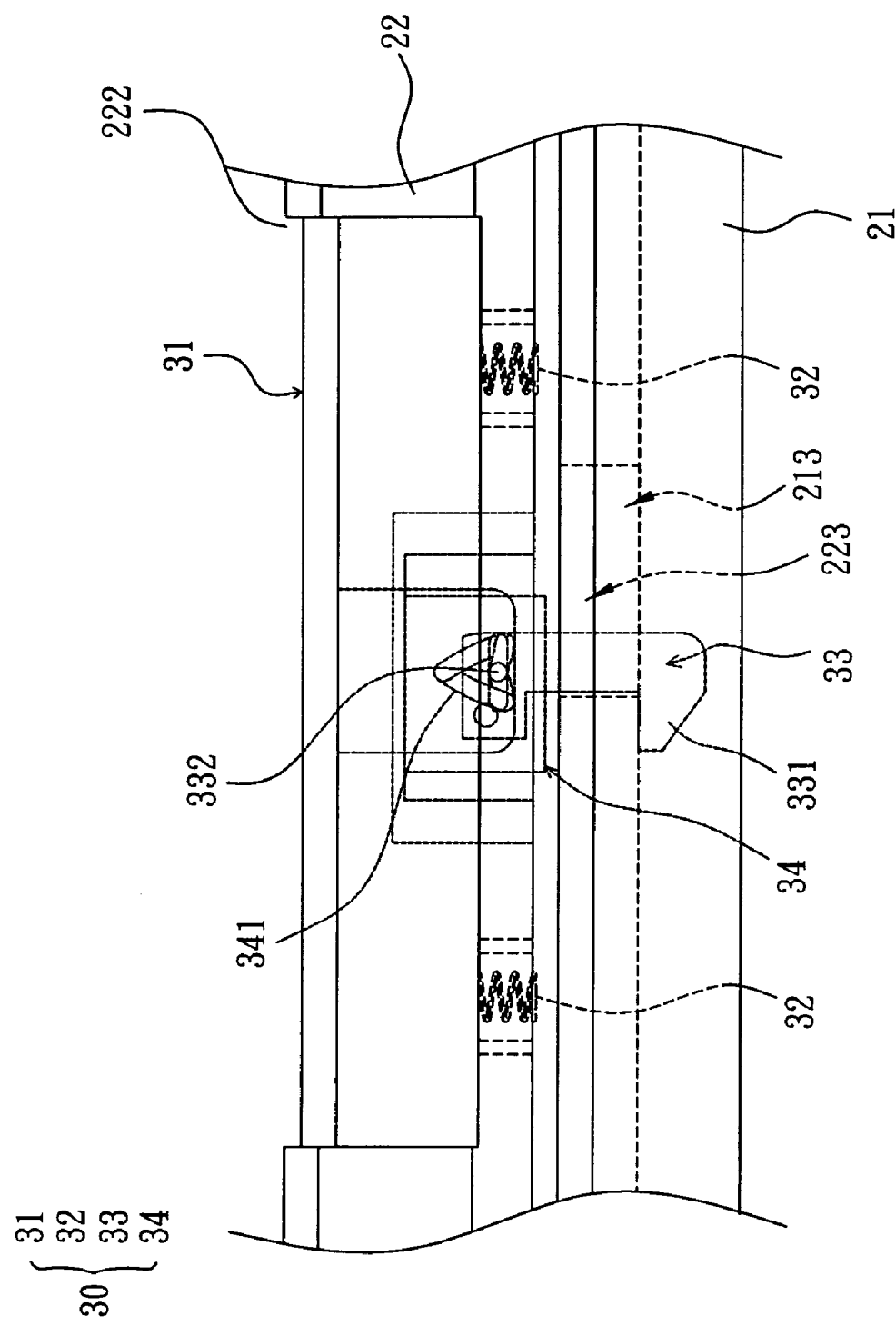
FIG. 8 is a schematic illustration showing still another operation of the latch structure of the electronic device according to the preferred embodiment of the invention.
Figure 9:
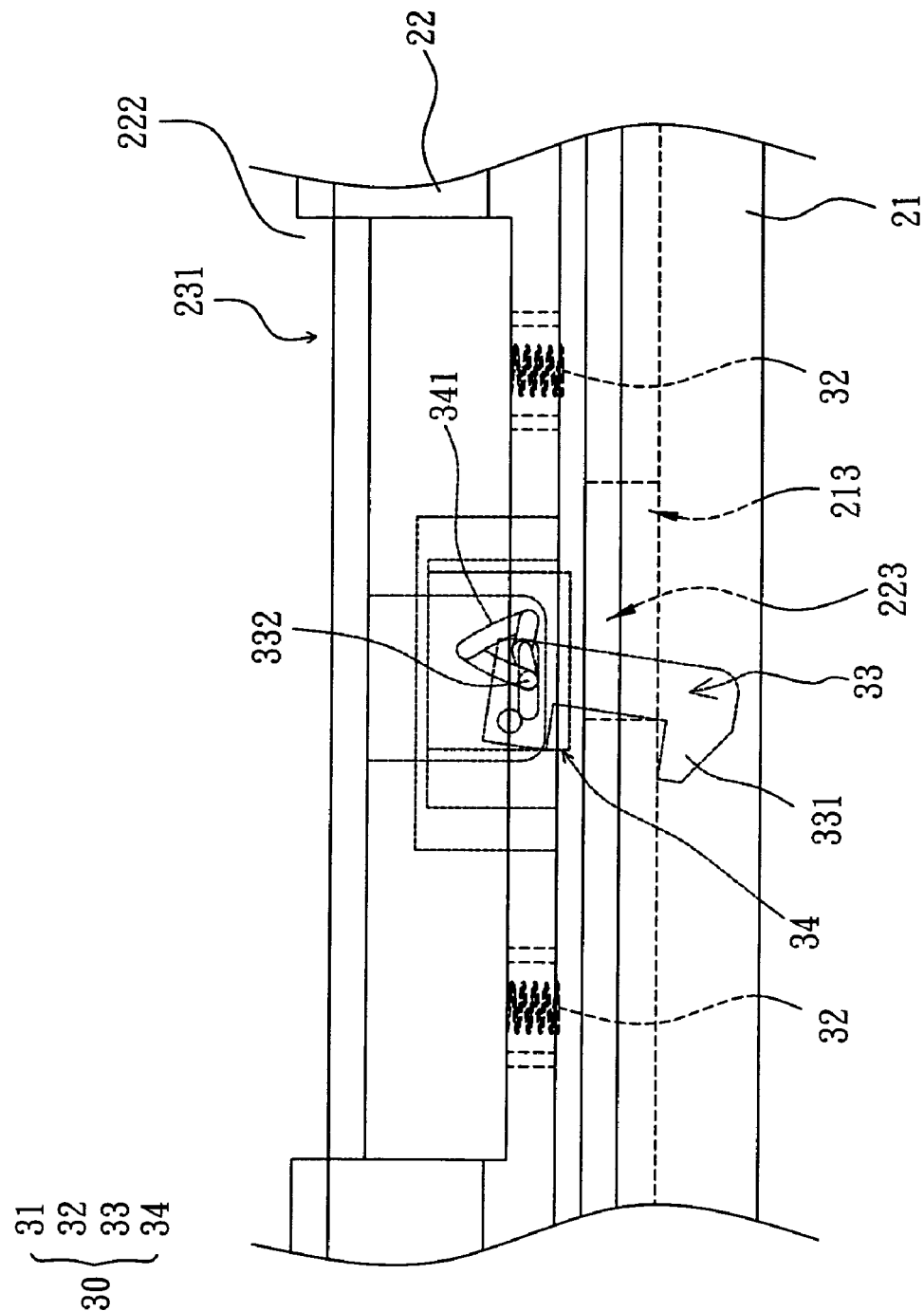
FIG. 9 is a schematic illustration showing yet still another operation of the latch structure of the electronic device according to the preferred embodiment of the invention.

Please refer to FIGS. 8 and 9 simultaneously. When the user wants to open the second casing 22, he or she can apply another external force to the pressing member 31 to move the pressing member 31 in the first direction and thus move the protrusion 332 from the third route 3413 to the fourth route 3414. At this time, the protrusion 332 is moved from the third turning portion 3417c to the fourth turning portion 3417d, and the fourth turning portion 3417d interferes with the protrusion 332 such that the user cannot continue pushing the pressing member 31 in the first direction and the external force applied to the pressing member 31 is removed naturally. The step 3415c disables the protrusion 332 from returning to the third route 3413 from the fourth route 3414. Thereafter, please refer to FIGS. 9 and 3 simultaneously. The elastic member 32 pushes the pressing member 31 in the second direction, and the protrusion 332 is moved from the fourth route 3414 to the first route 3411. At this time, the protrusion 332 is moved from the fourth turning portion 3417d to the first turning portion 3417a, and the first turning portion 3417a interferes with the protrusion 332 such that the restoring force cannot continue moving the protrusion 332. The step 3415d disables the protrusion 332 from returning to the fourth route 3414 from the first route 3411. At this time, as shown in FIG. 3, the hook portion 331 of the hook member 33 passes through the second opening 223 to be hidden inside the second casing 22. Consequently, the hook portion 331 does not engage with the engagement portion 213, and the user can open the second casing 22 and adjust the angle between the second casing 22 and the first casing 21 according to the requirement.

The invention also discloses a latch structure in another preferred embodiment. The latch structure is disposed in a casing having a first surface and a second surface disposed opposite to the first surface. The first surface and the second surface are formed with a first opening and a second opening, respectively. Herein, the casing is the second casing 22 of the embodiment and is thus a cover. In addition, the latch structure of this embodiment includes a pressing member, an elastic member, a hook member and a guiding member. Because the latch structure is the same as the electronic device 2 of the previous embodiment, the detailed descriptions thereof will be omitted for concise purpose.

In summary, the pressing member, the elastic member, the hook member and the guiding member in the electronic device and the latch structure thereof are particularly designed and connected. Thus, when the first casing is opened relative to the second casing, the hook portion of the hook member is hidden inside the second casing. As a result, the visual glory effect may be achieved, and the hook member is free from collision and damage. In addition, it is possible to eliminate the drawback of deformation and break of the hook when the conventional structure is opened and closed, and good industrial utility can be obtained.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A latch structure disposed in a casing, said casing includes a first casing and a second casing wherein one of said first casing and said second casing has a first surface and a second surface disposed opposite to the first surface, and the first surface and the second surface are formed with a first opening and a second opening, respectively, the latch structure comprising:
   a pressing member passing through the first opening;
   an elastic member having one side connected with the casing and another side connected with the pressing member;
   a hook member pivoted on the pressing member and having a hook portion and a protrusion connected with the hook portion, wherein the hook portion is positioned opposite to the second opening and is capable of passing through the second opening to be exposed from the casing or be hidden inside the casing; and
   a guiding member having a multi-route circle groove, wherein the multi-route circle groove has a first route, a second route, a third route and a fourth route in turn, steps are respectively formed between the first route and the second route, between the second route, between the third route and the fourth route and between the fourth route and the first route, the protrusion of the hook member is slidably disposed in the multi-route circle groove, the pressing member moves the protrusion along the first route, the second route, the third route and the fourth route in turn, and when the pressing member is moved, the pressing member moves the protrusion in the multi-route circle groove such that the hook portion passes through the second opening to be exposed from the casing or be hidden inside the casing.

2. The latch structure according to claim 1, wherein when the pressing member is moved in a first direction by an external force, the protrusion is moved from the first route to the second route or from the third route to the fourth route, the step between the fourth route and the first route prevents the protrusion in the first route from returning to the fourth route, and the step between the second route and the third route prevents the protrusion in the third route from returning to the second route.

3. The latch structure according to claim 2, wherein when the external force is removed, the elastic member has a restoring force for moving the pressing member in a second direction opposite to the first direction, the protrusion is moved from the second route to the third route or from the fourth route to the first route, the step between the first route and the second route prevents the protrusion in the second route from returning to the first route, and the step between the third route and the fourth route prevents the protrusion in the fourth route from returning to the third route.

4. The latch structure according to claim 2, wherein:
   a first turning portion, a second turning portion, a third turning portion and a fourth turning portion are respectively formed between the first route and the second route, between the second route and the third route, between the third route and the fourth route and between the fourth route and the first route;
   the external force moves the protrusion from the first turning portion to the second turning portion, or from the third turning portion to the fourth turning portion; and
   when the external force is removed, a restoring force of the elastic member moves the protrusion from the second turning portion to the third turning portion or from the fourth turning portion to the first turning portion.

5. The latch structure according to claim 4, wherein the second turning portion and the fourth turning portion are respectively located at two sides of a straight line, and the straight line connects the first turning portion with the third turning portion.

6. The latch structure according to claim 4, wherein a vertical distance from the first turning portion to the pressing member is smaller than a vertical distance from the third turning portion to the pressing member, and a vertical distance from the third turning portion to the pressing member is smaller than a vertical distance from the second turning portion to the pressing member and a vertical distance from the fourth turning portion to the pressing member.

7. The latch structure according to claim 1, wherein:
   a first connecting bottom and a second connecting bottom are formed at an abutting portion between the first route and the second route;
   a third connecting bottom and a fourth connecting bottom are formed at an abutting portion between the second route and the third route;
   a fifth connecting bottom and a sixth connecting bottom are formed at an abutting portion between the third route and the fourth route;
   a seventh connecting bottom and an eighth connecting bottom are formed at an abutting portion between the fourth route and the first route; and
   a depth of the first connecting bottom is smaller than a depth of the second connecting bottom, a depth of the third connecting bottom is smaller than a depth of the fourth connecting bottom, a depth of the fifth connecting bottom is smaller than a depth of the sixth connecting bottom, and a depth of the seventh connecting bottom is smaller than a depth of the eighth connecting bottom such that the steps are formed.

8. The latch structure according to claim 7, wherein a depth of the first route gradually decreases from the eighth connecting bottom to the first connecting bottom.

9. The latch structure according to claim 7, wherein a depth of the second route gradually decreases from the second connecting bottom to the third connecting bottom.

10. The latch structure according to claim 7, wherein a depth of the third route gradually decreases from the fourth connecting bottom to the fifth connecting bottom.

11. The latch structure according to claim 7, wherein a depth of the fourth route gradually decreases from the sixth connecting bottom to the seventh connecting bottom.

12. The latch structure according to claim 1, wherein the guiding member slides in the casing relatively when the protrusion slides in the multi-route circle groove.

13. The latch structure according to claim 1, wherein the elastic member is a spring, an elastomer or an elastic sheet.

14. The latch structure according to claim 1, wherein the pressing member has a through hole, and the protrusion passes through the through hole and is pivoted with the pressing member.

15. An electronic device, comprising:
a first casing;
a second casing pivoted with the first casing and having a first surface and a second surface disposed opposite to the first surface, wherein the first surface and the second surface are formed with a first opening and a second opening, respectively; and
a latch structure disposed in the second casing and comprising:
a pressing member passing through the first opening,
an elastic member having one side connected with the second casing and another side connected with the pressing member,
a hook member pivoted with the pressing member and having a hook portion and a protrusion, wherein the hook portion is positioned opposite to the second opening, and the protrusion is connected with the hook portion, and
a guiding member having a multi-route circle groove, wherein the multi-route circle groove has a first route, a second route, a third route and a fourth route in turn, steps are formed between the first route and the second route, between the second route and the third route, between the third route and the fourth route and between the fourth route and the first route, the protrusion of the hook member is slidably disposed in the multi-route circle groove, the pressing member moves the protrusion along the first route, the second route, the third route and the fourth route in turn, and when the pressing member is moved, the pressing member moves the protrusion in the multi-route circle groove such that the hook portion passes through the second opening to be exposed from the casing or be hidden inside the second casing.

16. The electronic device according to claim 15, wherein when the pressing member is moved in a first direction by an external force, the protrusion is moved from the first route to the second route or from the third route to the fourth route, the step between the fourth route and the first route prevents the protrusion in the first route from returning to the fourth route, and the step between the second route and the third route prevents the protrusion in the third route from returning to the second route.

17. The electronic device according to claim 16, wherein when the external force is removed, the elastic member has a restoring force for moving the pressing member in a second direction opposite to the first direction, the protrusion is moved from the second route to the third route or from the fourth route to the first route, the step between the first route and the second route prevents the protrusion in the second route from returning to the first route, and the step between the third route and the fourth route prevents the protrusion in the fourth route from returning to the third route.

18. The electronic device according to claim 16, wherein:
a first turning portion, a second turning portion, a third turning portion and a fourth turning portion are respectively formed between the first route and the second route, between the second route and the third route, between the third route and the fourth route and between the fourth route and the first route;
the external force moves the protrusion from the first turning portion to the second turning portion, or from the third turning portion to the fourth turning portion; and
when the external force is removed, a restoring force of the elastic member moves the protrusion from the second turning portion to the third turning portion or from the fourth turning portion to the first turning portion.

19. The electronic device according to claim 18, wherein the second turning portion and the fourth turning portion are respectively located at two sides of a straight line, and the straight line connects the first turning portion with the third turning portion.

20. The electronic device according to claim 18, wherein a vertical distance from the first turning portion to the pressing member is smaller than a vertical distance from the third turning portion to the pressing member, and a vertical distance from the third turning portion to the pressing member is smaller than a vertical distance from the second turning portion to the pressing member and a vertical distance from the fourth turning portion to the pressing member.

21. The electronic device according to claim 15, wherein:
a first connecting bottom and a second connecting bottom are formed at an abutting portion between the first route and the second route;
a third connecting bottom and a fourth connecting bottom are formed at an abutting portion between the second route and the third route;
a fifth connecting bottom and a sixth connecting bottom are formed at an abutting portion between the third route and the fourth route;
a seventh connecting bottom and an eighth connecting bottom are formed at an abutting portion between the fourth route and the first route; and
a depth of the first connecting bottom is smaller than a depth of the second connecting bottom, a depth of the third connecting bottom is smaller than a depth of the fourth connecting bottom, a depth of the fifth connecting bottom is smaller than a depth of the sixth connecting bottom, and a depth of the seventh connecting bottom is smaller than a depth of the eighth connecting bottom such that the steps are formed.

22. The electronic device according to claim 21, wherein a depth of the first route gradually decreases from the eighth connecting bottom to the first connecting bottom.

23. The electronic device according to claim 21, wherein a depth of the second route gradually decreases from the second connecting bottom to the third connecting bottom.

24. The electronic device according to claim 21, wherein a depth of the third route gradually decreases from the fourth connecting bottom to the fifth connecting bottom.

25. The electronic device according to claim 21, wherein a depth of the fourth route gradually decreases from the sixth connecting bottom to the seventh connecting bottom.

26. The electronic device according to claim 15, wherein the guiding member slides in the casing relatively when the protrusion slides in the multi-route circle groove.

27. The electronic device according to claim 15, wherein the elastic member is a spring, an elastomer or an elastic sheet.

28. The electronic device according to claim 15, wherein the pressing member has a through hole, and the protrusion passes through the through hole and is pivoted with the pressing member.

* * * * *